Feb. 8, 1966    J. E. GALLO    3,233,396
METHOD AND APPARATUS FOR HARVESTING GRAPES
Filed June 21, 1962    4 Sheets-Sheet 1
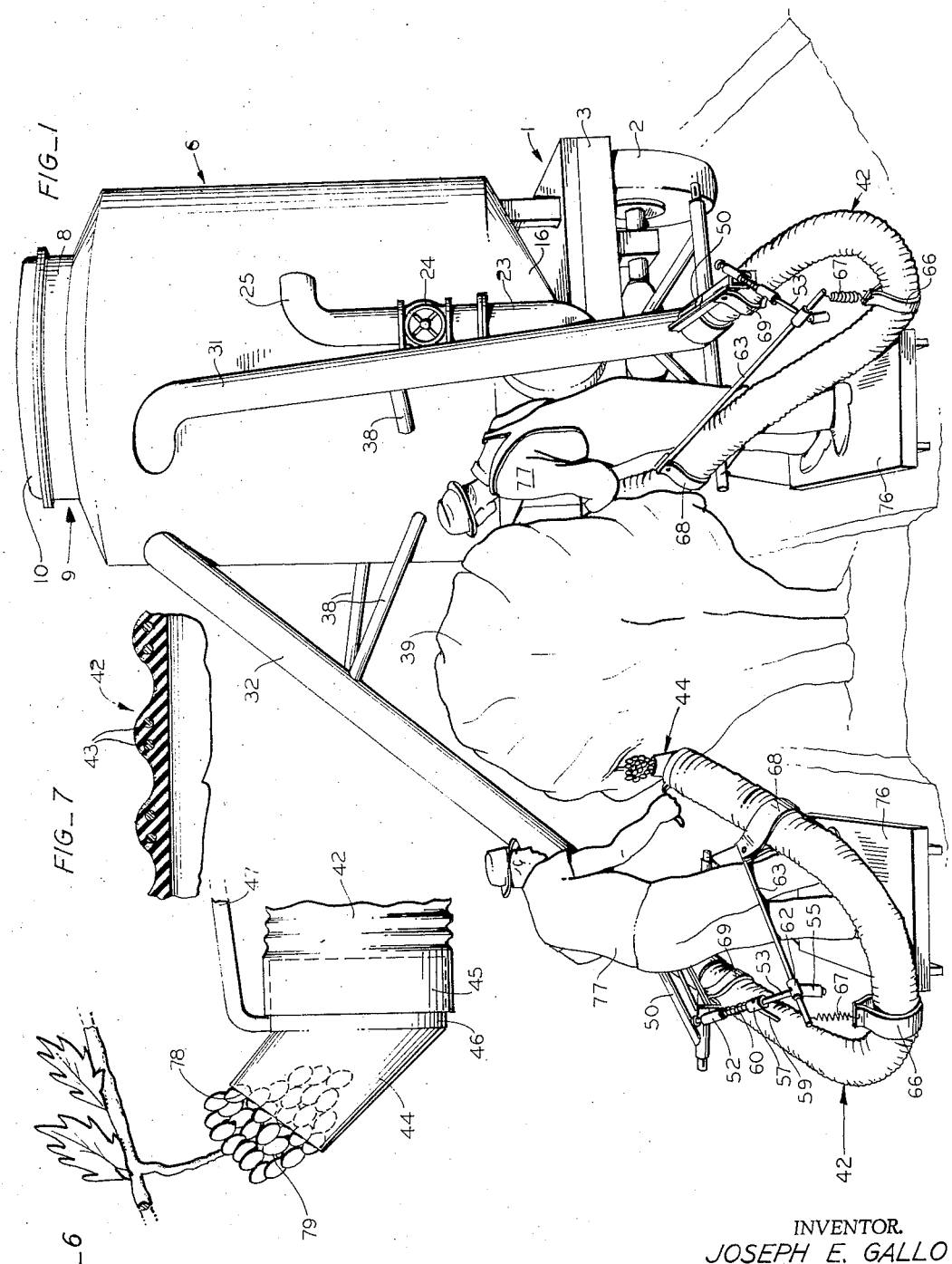
INVENTOR.
JOSEPH E. GALLO
BY
Boyken, Mohler & Foster
ATTORNEYS

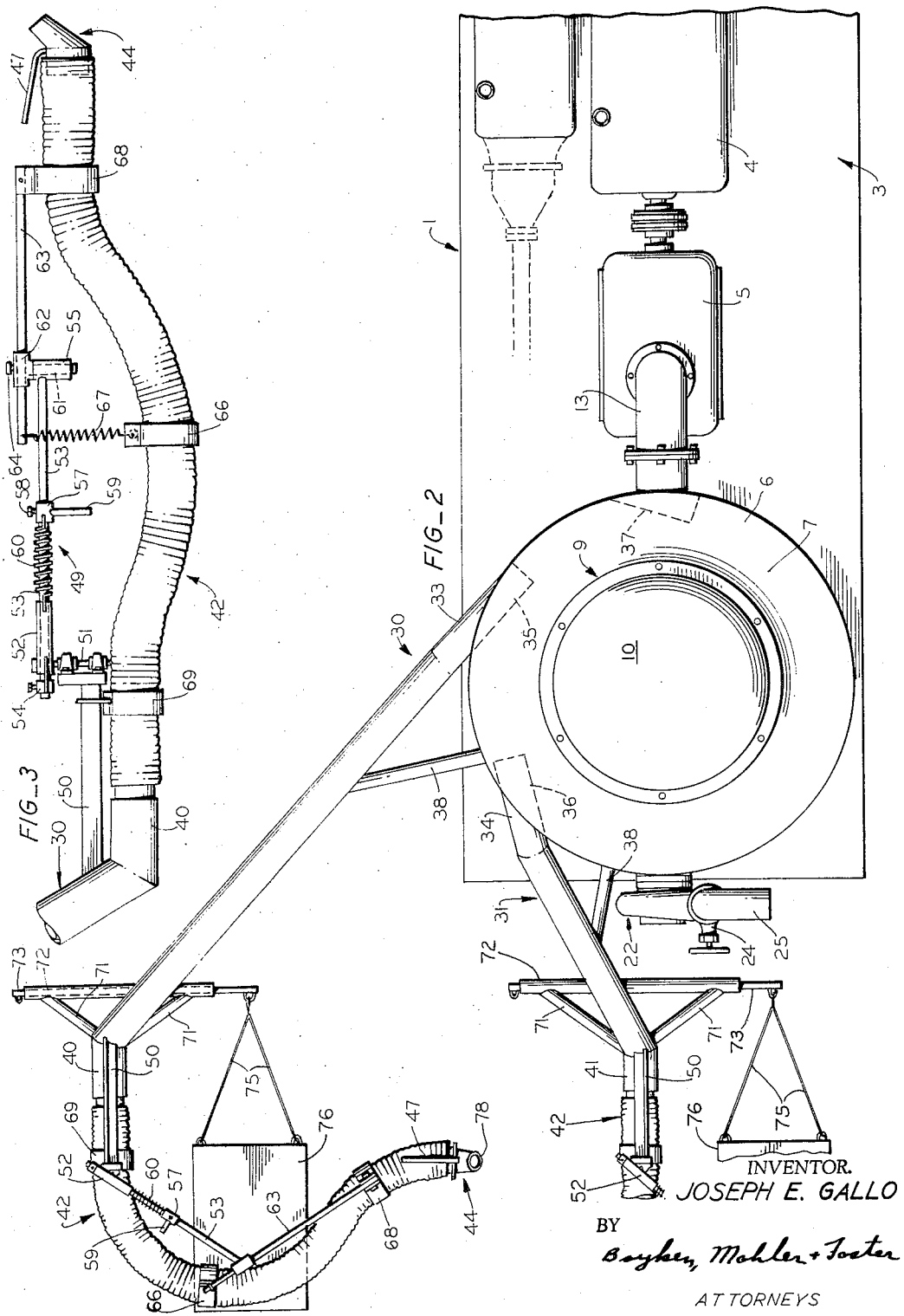

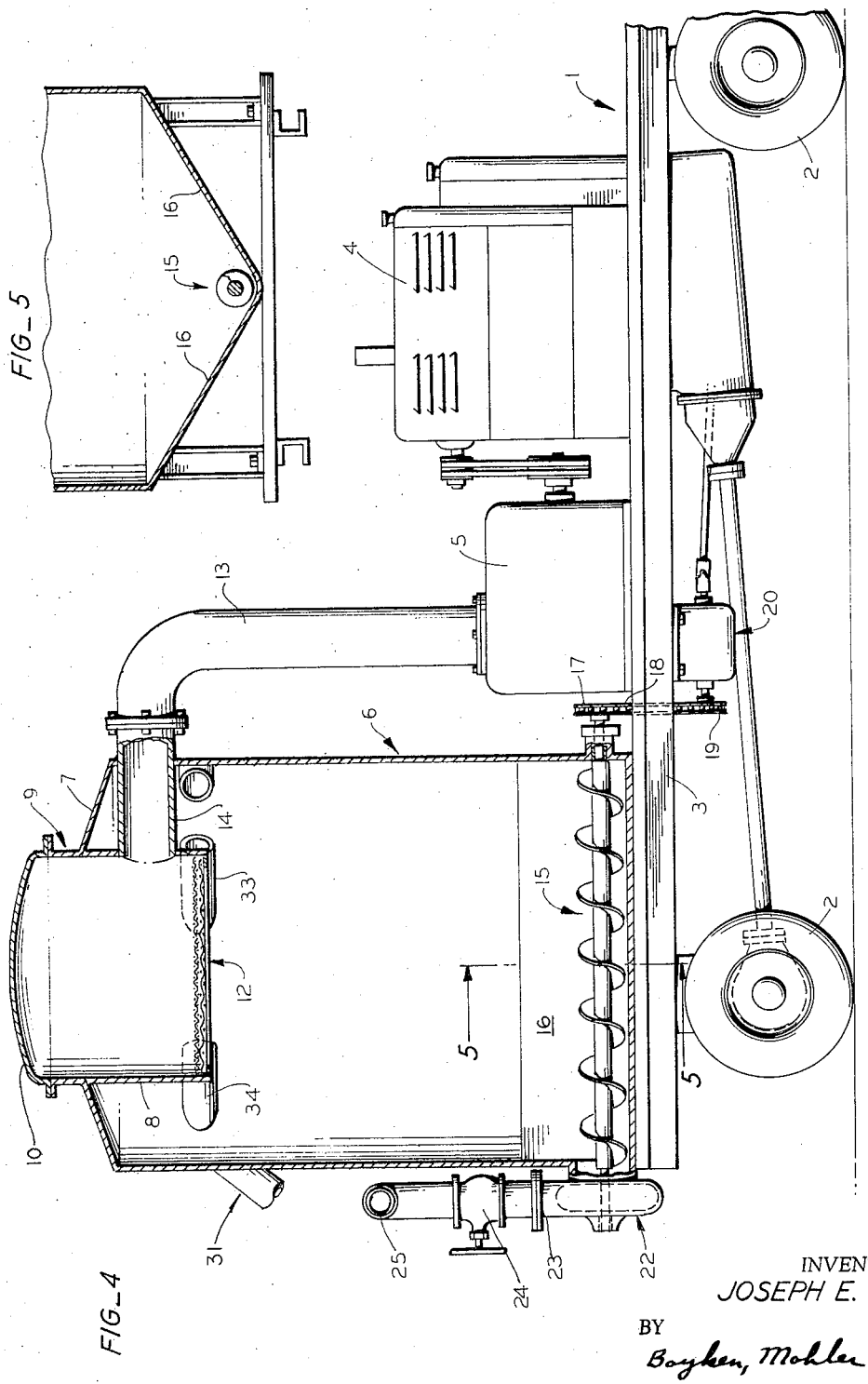

Feb. 8, 1966   J. E. GALLO   3,233,396
METHOD AND APPARATUS FOR HARVESTING GRAPES
Filed June 21, 1962   4 Sheets-Sheet 4
FIG_8
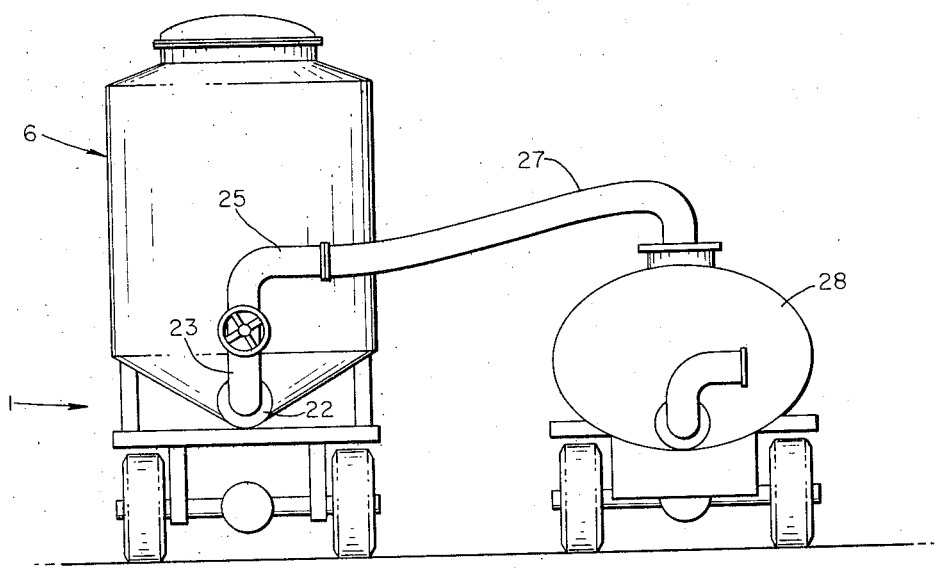
FIG_9
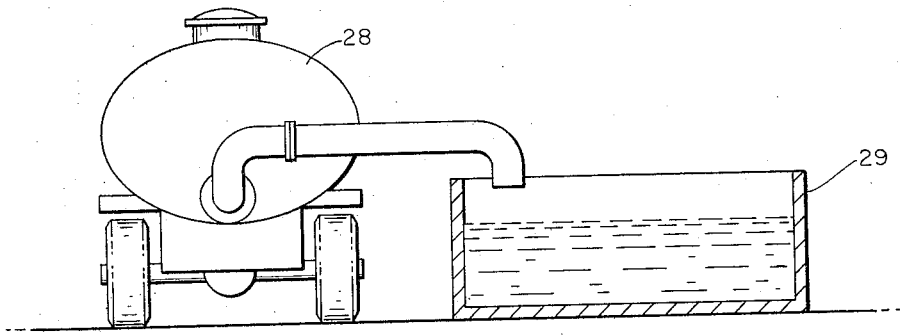
INVENTOR.
JOSEPH E. GALLO
BY
Boghen, Mohler + Foster
ATTORNEYS United States Patent Office 3,233,396
Patented Feb. 8, 1966

3,233,396
METHOD AND APPARATUS FOR
HARVESTING GRAPES
Joseph E. Gallo, 14030 Vinewood Ave., Livingston, Calif.
Filed June 21, 1962, Ser. No. 204,108
15 Claims. (Cl. 56—328)

This invention relates to wine making, and has for one of its objects the provision of certain method steps in the making of wine that contribute to the production of improved wine.

Another object of the invention is the provision of a method in the initial steps of making wine that produces less stem break-up to thereby substantially eliminate the crushing step and stem handling and disposal thereof at the winery, as heretofore practiced.

A still further object of the invention is the provision of steps in the initial period of wine making that reduces the number of stems in the must.

An added object is an improvement in the initial wine making steps that materially reduces contamination of the grapes and juice after the grapes have been separated from the vines, and that insures against the loss of sugar bearing juice.

Another object is the provision of steps in a method of making wine whereby detrimental exposure of grapes to the atmosphere is reduced.

An added object is the provision of apparatus by which the above enumerated objects, and others, are accomplished.

Heretofore in the making of wine, the bunches of grapes are cut from the vines and placed in boxes that, in turn, may be carried to open trucks or trailers in the vineyard into which the grapes are dumped. They are then conveyed in such trucks to the winery where the grapes are again dumped into a receptacle for crushing and for the separation of the stems from the skins, meat and juice of the grapes. The skins and juice and perhaps some stems, depending on the efficiency of the stemming process then go to the fermenting tanks in the winery where the grape sugar is converted into alcohol by well known wine-making processes. The product introduced into the fermenting tanks is commonly known as "must." The method and apparatus of this invention is not concerned with the fermentation step, or with the steps following fermentation, but rather with the production of such must.

It is recognized that the manner in which the grapes are handled, as well as the ripeness of the grapes at the commencement of the wine making method or process, has a material bearing on the quality of the wine that is produced.

In the present method and by the apparatus hereafter described the grapes are removed from the stems and the latter remain on the vines, hence the stem removing step at the winery, as heretofore practiced, may be eliminated resulting not only in a saving in time but in a better wine, since the stems are not held with the grapes after the grapes are picked.

Also by the present method and apparatus, the grapes are not touched by the hands of the operators at any time, and are not exposed to contamination by dust, insects, or other foreign material. During the period from picking until receipt at the winery the grapes and juice therefrom (must) are not exposed to oxidation in the free air, with the result that better wine is assured than heretofore. The shorter the time between the picking of the grapes and the crushing thereof to convert them to must, the better the wine. Where this time heretofore may be many hours, by the present method the time is reduced to seconds.

It is also important that the sugar carrying juices should not be lost. Heretofore when bunches of grapes were loaded and unloaded into vehicles, and during the stemming operation, many grapes were crushed and juice therefrom was carried away on the stems. In the present method, none of such juice is lost.

Since fermentation is accelerated by heat and the grapes become quite hot due to the atmospheric temperature in favorable grape growing localities, it is obvious that any reduction in the temperature of the grapes after they are cut from the vines, and before they reach the fermenting tanks, will improve the quality of the wine.

In the present instance, as soon as the grapes are removed from the vines vaporization of moisture is accelerated thereby reducing the temperature of the grapes. This acceleration of vaporization continues during the time the grapes are crushed and substantially until the grapes and juice are in closed tanks on their way to the winery.

By the present method and apparatus transportation costs from the vineyard to the winery are reduced since no stems are transported, and also the time needed to process the grape crops is reduced, thus permitting the grapes to be harvested at peak ripeness. This latter advantage clearly results in the production of better wine.

Other objects and advantages will appear in the description and in the drawings:

In the drawings, FIG. 1 is a rear elevational view of the harvesting apparatus of this invention during picking of the grapes in the vineyard;

FIG. 2 is a top plan view of the apparatus of FIG. 1;

FIG. 3 is an enlarged elevational view of one of the flexible conduits through which the grapes are conveyed after picking;

FIG. 4 is a partly sectional, partly side elevational view of the apparatus of FIG. 1 with the flexible conduits not shown;

FIG. 5 is a fragmentary cross sectional view taken along line 5—5 of FIG. 4;

FIG. 6 is an enlarged, fragmentary view of the grape receiving nozzle at the outer end of each flexible conduit;

FIG. 7 is a greatly enlarged fragmentary cross sectional view through one sidewall of the flexible conduit;

FIG. 8 is a semischematic diagram of the apparatus of this invention showing the step of transferring the must from the harvesting apparatus to a tank truck for transportation to the winery;

FIG. 9 is a semischematic diagram of a tank truck showing the step of unloading the must from the same into a fermenting tank at the winery.

In detail, the apparatus illustrated in the drawings comprises a motor propelled vehicle, generally designated 1, having the usual ground wheels 2 that support a chassis 3 (FIGS. 1, 4), which chassis, in turn, carries a motor 4 that is connected with a suction pump 5 (FIGS. 2, 4).

A relatively large, upright tank or enclosed chamber 6 is supported on chassis 3 adjacent to the pump 5, which tank has an upper head 7 that is formed with a central opening in which is secured the vertical sidewalls 8 (FIGS. 1, 4) of an air dome generally designated 9.

The sidewalls 8 of the air dome 9 are preferably cylindrical and project downwardly past head 7 into the upper end portion of tank 6. A cover plate 10 is removably secured by bolts, or the equivalent, over the upper end of the cylinder 8 to form the upper closed end of the air dome.

A screen or plurality of suitable screens 12 extend across the lower open end of the cylinder 8 to form the perforate, lower end of the air dome 9.

Suction pipe 13 is connected at one end with the intake of pump 5, and extends vertically upwardly alongside the tank 6 to the upper end of the latter, where an elbow connects with a horizontal extension 14 (FIG. 4) of the pipe 13 to connect with and open into the lower portion of air dome 9 through the lower end of the cylindrical wall 8 at a point spaced slightly above the horizontal screen closure 12 that forms the lower end of the air dome 9.

The bottom (FIG. 5) of tank 6 comprises a pair of downwardly inclined walls 16 that generally form a V trough, in cross sectional contour, but curved at their juncture centrally of the tank to receive a horizontally extending screw conveyor 15 that extends longitudinally of the longitudinal axis of the chassis 3.

One end of the shaft of the screw conveyor rotatably extends through a packing gland in the lower portion of the wall of tank 6 adjacent to the pump 5 (FIG. 4) and the outer end of said shaft may carry a sprocket wheel 17 that is connected by a sprocket chain 18 with a sprocket wheel 19 on a conventional driver controlled power take-off transmission 20 that may be connected with the engine (not shown) for the vehicle 1, so that the screw conveyor may be actuated, as and when desired by the operator.

The opposite end of the conveyor shaft carries a conventional vane pump 22, the intake opening of which is concentric with the conveyor shaft, and opens into the lower end of tank 6.

An upwardly extending discharge conduit 23 having a manually controlled valve 24 therein is connected with the outlet of pump 22.

The upper end of the conduit 23 is preferably provided with a right angle extension 25 (FIGS. 1, 2) that may be quickly coupled to a conventional flexible conduit 27 (FIG. 8) for discharge of the material within the tank 6 into a transport tank truck 28. After transport from the vineyard in the closed tank of a truck 28 the contents are unloaded at the winery into the conventional fermenting tanks 29 (FIG. 9). The tank trucks 28 may be conventional of the type used for transporting milk, wine, and the like in bulk.

Tangentially extending into the upper end portion of tank 6 through the sidewalls of the latter at one lateral side of the tank, and at one side of a medial vertical plane extending longitudinally of the chassis, are a pair of cylindrical conduits 30, 31 (FIG. 2). These conduits extend slantingly downwardly and rearwardly relative to the normal forward movement of the vehicle 1 (FIGS. 1, 2), but their upper end portions 33, 34 (FIGS. 2, 4) where they extend through the wall of tank 6 are preferably horizontal. The upper end portions 33, 34 preferably terminate within the upper portion of tank 6 at a level that is about even with the level of the screens 12, and at a level adjacent to the level of the lowermost side of the extension 14 of the suction conduit 13 (FIG. 4).

As best seen in FIG. 2 the upper end portions 33, 34 of the conduits 30, 31 extend tangentially into the tank in the same direction, and their ends that open into the tank are directed generally toward the rear side of the tank, with the portion 33 nearest to the extension 14 of the suction conduit 13. Said portions 33, 34 are spaced from each other and the portion 33 is spaced from the extension 14. The spacing between portions 33, 34 may be approximately equal to the distance portion 33 is spaced from extension 14, and this may be from approximately a fifth to a sixth of the circumference of the wall of tank 6, although it is to be understood that this is not necessarily to be considered a restriction.

The terminating end edges of the portions 33, 34 are in a plane approximately normal to the axis of portion 33 and the end edge of each portion that is nearest to the sidewall of tank 6, is approximately at said sidewall. Thus the cylindrical wall of each portion 33, 34 that is opposite to the lateral side having the end edge at the wall of tank 6 projects into the tank (FIG. 2) as indicated by the numerals 35, 36.

Spaced rearwardly of the wall 35 of portion 33 a distance approximately equal to the spacing between the parts 35, 36, is a part 37 that is identical to parts 35, 36, and it projects inwardly into the tank in the same manner as the parts 35, 36, as though it were part of the upper portion of a third conduit.

The parts 35, 36 function to give the desired tangential directional movement of material discharged from the open ends of the portions 33, 34. In addition, the part 35 functions to provide a baffle or impacting surface against which grapes are discharged from said portion 34. The part 37 ahead or outwardly of the discharge end of portion 33 provides a cylindrical baffle or impacting surface adapted to be engaged by grapes discharged from the portion 33. The operation of the conduits 30, 31 will be explained later.

The upper end portions of conduits 30, 31 are welded or otherwise rigidly secured to the wall of tank 6, and spaced below the upper end portions of said conduits are rigid braces 38 (FIGS. 1, 2) that rigidly connect with the conduits and the wall of tank 6 to rigidly hold the conduits 30, 31 stationary in their downwardly inclined positions.

The lower end of the rigid conduit 30 terminates at a point sufficiently offset to the lateral side of the vehicle 1 to extend over a row of vines 39 that is along one side of the path of travel of the vehicle. The vehicle is adapted to travel between adjacent rows longitudinally thereof.

The lower end of the rigid conduit 31 terminates within the same space that the vehicle 1 is adapted to travel, and at the opposite side of the same row of vines 39 over which conduit 30 extends.

Preferably the lower end portions 40, 41 of conduits 30, 31 respectively, extend rearwardly and approximately horizontally so that the open ends of said lower portions are directed rearwardly.

It is to be understood that the words "rearwardly," "forwardly" and other words of similar import are used with reference to the normal forward movement of the vehicle 1. Thus the motor 4, and pump 5 are forwardly of the tank 6 while the conduits 30, 31 project rearwardly of the tank 6, although they connect with a lateral side of the tank at their forward ends, as has been described.

The lower end portions 40, 41 are each adapted to be coupled to one end of a flexible conduit generally designated 42. Inasmuch as the conduits 42 on each of the lower end portions 40, 41 have corresponding structure, a description of one of the two conduits will suffice, except where the description may be clarified to make a distinction between the two.

FIG. 3 is a side elevational view of the conduit 42 that is connected with the lower portion 40, as seen from the side of the portion 40 that is remote from the vehicle 1, and in FIG. 3 the conduit 42 is straightened out to better illustrate the elements connected therewith.

Each conduit 42 is flexible, the walls being formed of fabric reinforced rubber or the like in which is embedded a helical coil that comprises a pair of wires 43 (FIG. 7). The adjacent coils of the wire are spaced apart and the inner surface is preferably substantially straight, longitudinally of the conduit, although the outer surface has a helical ridge in which the wires 43 are embedded. By this structure, the conduit is rigid against collapse longitudinally and axially thereof, but is highly flexible so that it can readily be bent to substantially U shape during manual manipulation thereof.

An intake nozzle 44 is releasably secured on the outer end of the flexible conduit 42, which nozzle is indicated in detail in FIG. 6. This nozzle 44 preferably extends upwardly at an angle of approximately 45° relative to the longitudinal axis of conduit 42 when the latter is straight and horizontal, or at approximately 45° relative to an annular collar 45 of the conduit to which an annular extension 46 of the nozzle is adapted to be secured, said collar 45 being coaxial with the outer end of conduit 42.

Secured to said nozzle, or to the extension 46 at the upper side of the latter, is a handle 47 that extends generally horizontally over the outer end of the conduit 42.

Between the nozzle 44 and the inner end of the conduit 42 is a flexible support generally designated 49 (FIG. 3) that is not only adapted to permit bending and swinging of the conduit 42 in a generally horizontal plane, but which support also supports the conduit in a generally horizontally extending position so that an operator holding handle 47 in one hand can readily manipulate the nozzle 44 to reach every portion of each vine 39 that is at his side of the row thereof without carrying the weight of the conduit. The support 49 functions more or less as a counterbalance for the conduit and nozzle.

Referring to FIG. 3 said support 49 comprises a rigid horizontally extending brace 50 that is connected at one end with the lower end of the rigid conduit 30 (or 31), an that projects rearwardly from said rigid conduit. The rear end of said brace 50 carries bearings that support a vertical pivot pin 51, which pivot pin, in turn, is connected at its upper end with one end of a horizontally extending tubular member 52 to enable swinging said tubular member about a vertical axis.

Extending through said tubular member 52 and rotatable therein is one end of rod 53 that is provided with a collar 54 on said one end to prevent withdrawal of said rod from said member. The opposite end of rod 53 projects a substantial distance from the end of member 52 that is opposite to said collar and to a point that is intermediate the opposite ends of the conduit 42. The outer end of rod 53 that is remote from the member 52 is rigid with a vertical bearing 55.

Intermediate the member 52 and the bearing 55 is a collar 57 that is adapted to be secured to said rod by a set screw 58, and a handle 59 projects radially from said collar 57.

A torsion spring 60 is disposed around the portion of rod 53 that is between the member 52 and collar 57, which spring is secured at its opposite ends to said member and said collar. This torsion spring is tensioned to any desired degree by rotating the collar 57 in one direction and then securing the collar to the rod 53 after the desired tension is obtained, after which the spring will react to tend to rotate rod 53 in one direction. As will later appear, this reaction of the spring will result in yieldably supporting the conduit when the latter is in its generally U shaped position when in use, as seen in FIG. 1.

The bearing 55 on the end of rod 53 rotatably receives a pivot pin 61 that depends from, and is rigid with, a horizontally disposed sleeve 62. A horizontally extending rod 63 slidably extends into sleeve 62 and is releasably secured to said sleeve by a set screw 64, so that the degree to which the ends of the rod 63 project from said sleeve may be adjusted.

A sling 66 around the conduit 42 at a point that is adjacent to the middle of the U bend in the conduit, when the latter is in use, is supported from one end of rod 63 by a spring 67, while a similar sling 68 at the opposite end of rod 63 supports the outer end portion of conduit 42 directly therefrom. A similar sling 69 may support the inner end of conduit 42 directly from the outer end of brace 50. These slings may be of belting, so as not to chafe or injure the conduit.

In use, referring to FIGS. 1 and 2, the rod 63 will extend at a substantial angle to rod 53, and the tension of the spring 60 will yieldably support the portion of the conduit 42 that is between slings 68, 69 spaced above the ground and in a generally horizontally disposed position while the operator is manually manipulating the nozzle 44 in a grape harvesting operation. When the nozzle 44 is being used, as indicated in FIG. 1, the end of the rod 63 that is opposite to sling 68 will be generally over the U bend of the conduit 42, that the spring 67 and said rod will coact with the torsion spring 60 for supporting the portion of conduit 42 that is between slings 68, 69.

The tension of spring 60 may, of course, be varied by loosening set screw 58 and rotating collar 57 in the desired direction and to the desired degree to obtain the desired tension, after which set screw 58 may be retightened.

Connected with the lower end portion of each rigid conduit 30, 31 are a pair of arms 71 (FIG. 2) that extend forwardly from said lower end portions, each pair of which are secured at their divergent ends to a horizontally disposed tubular element 72 through which extends a bar 73. This bar projects from the opposite ends of element 72 and is rotatably supported in the latter. The projecting ends of bar 73 are connected with rearwardly divergently extending rods or cables 75, that, in turn, are connected with a sled or any other suitable vehicle having a platform 76 thereon on which an operator 77 (FIG. 1) is adapted to stand while manipulating the nozzle 44 for removing the grapes from the vines 39.

Referring to FIG. 6, in which a nozzle 44 is shown, it is important that the circular inlet opening 78 of the nozzle be of a circumference that is approximately that of the maximum diameter of the average bunches of grapes that are to be harvested. Thus when the generally pointed lower end of each bunch of grapes 79 is received in the generally upwardly directed inlet opening 78, and the nozzle is elevated, the bunch of grapes will quickly substantially close the inlet opening. By experimentation a suitable sized opening for such nozzle has been found to be approximately 4 inches.

It is to be understood that the capacity of the air pump connected with the tank 6, and the capacity of the pipe 13 and conduits 30, 31 and 42 are such that where each nozzle 44 has an inside diameter at the inlet of approximately four inches, and a throat length from its outer end to collar 46 of approximately two inches, a partial vacuum of approximately five inches of mercury will be produced at the throat of each unobstructed nozzle with an air velocity of approximately four hundred and twenty feet per second. Under these conditions and with conduits 30, 31 of approximately 8 inch diameters, the vacuum in tank 6 is approximately 10–12 inches of mercury.

When a bunch of grapes is positioned in each nozzle the partial vacuum will be momentarily substantially increased (to perhaps 8 inches of mercury at the nozzle) as will the velocity. The inside diameter of each flexible conduit 42 is preferably approximately 6 inches and such that it will not collapse under the above conditions, and the reinforcing in the walls of each conduit 42 insures against radial and axial collapse.

In operation, the vehicle 1 is moved between a pair of rows of vines 39. An operator 77 on each platform or support 76 faces generally in the direction of movement of the vehicle and manipulates each nozzle 44 on each conduit 42 to receive a bunch of grapes in the inlet opening of each nozzle. This is easily and quickly accomplished, and as soon as a bunch of grapes is in each nozzle the grapes are all pulled from the main stem almost instantaneously and seconds later, at substantially atmospheric temperature are discharged into the upper portion of the tank and impacted against the convex surfaces of elements 35, 37 thus performing the crushing operation within seconds after the grapes are removed from the vines. At the same time vaporization of the moisture under subatmospheric pressure in tank 6 in the form of droplets of grape juice released by the breaking of the skins in the crushing step, and the collected juice is accelerated to reduce the temperature of the juice. This has the effect of inhibiting premature fermentation.

The movement of the nozzles in receiving grapes is generally vertically since the bunches hang vertically with the apices of their conical shapes lowermost. There is no difficulty encountered in reaching all of the grapes on a vine from each side of the latter inasmuch as the flexible conduit permits vertical and lateral movement.

It is obvious that an additional pair of nozzles and conduits could be provided to enable completely picking all of the desired grapes from several rows simultaneously, it being merely necessary to provide a vacuum pump of sufficient capacity.

It has been found that the impacting of the grapes against the cylindrical surfaces of the baffles or elements 35, 37 that extend angularly across the path of the travel of the discharged grapes, as seen in FIG. 2, produces better crushing results than were flat baffles provided. In the crushing of grapes, the seeds should not be cracked or crushed, and this does not occur in the present instance.

The must, which is the crushed grapes and juice, will drop by gravity to the bottom of the tank 6. None of the solids or juice passes into the air dome 9. Screens 12 and the location of the discharge openings from conduits 30, 31 are positioned to preclude this occurring.

As soon as the desired amount of must is in the tank 6, the contents are moved to pump 22, through operation of the screw conveyor 15, and are discharged thereby into a truck tank 28 (FIG. 8). The lid of the latter may then be closed and the tank 28 moved to the winery where the contents may be pumped into the fermenting tank 29 (FIG. 9) or into any suitable system leading to the fermenting tank. However, it should be noted that there is no need for the grapes to pass through a stemmer and crusher as is done at the present time, and the heretofore necessary steps of processing the stems in order to recover a substantial amount of the juice thereon is eliminated, since the stems are not picked, but remain in the field, and all of the free juice goes along with the grapes.

Inasmuch as the grapes are enclosed within the conduits 42, 30, 31, tank 6, and tank 28 from the time they are picked until they reach the winery, it is seen that they are conducted in an enclosed path from the vines to the winery and are crushed at a point in said path. This not only results in virtually eliminating any chance for contamination between the vines and winery, but oxidation of the juice is reduced. The same pneumatic motive force picks the grapes from the vines then conveys them along an enclosed path of travel out of contact with the atmospheric air at atmospheric pressure and ejects them into an enclosed space that is also out of contact with atmospheric air at atmospheric pressure, in which space the grapes are impacted against a hard surface to thereby rupture or fracture the skins and to express juice, after which impacting step said grapes and juice are conducted within an enclosed space to the winery where they are conducted from said enclosed space to a fermenting tank.

In the initial steps above mentioned in which the grapes are conducted into the enclosed space and are impacted to break the skins and to express juice, the vaporization of the juice under a reduced pressure will function to lower the temperature of the grapes and juice, below that of outside atmospheric temperature.

It is to be understood that many modifications can be made in the apparatus without departing from the spirit of the invention and the scope of the claims.

I claim:

1. The method of harvesting wine grapes that includes the steps of:
   (a) removing the grapes from the vines in the vineyard;
   (b) conducting said grapes, immediately after said removal thereof from the vines, in an enclosed path of travel into an enclosed space;
   (c) fracturing the skins of said grapes within said enclosed space to release the juice therein;
   (d) then conducting said skins and juice from the vineyard to the winery for transfer at the latter to a fermenting tank.

2. In the method as defined in claim 1:
   (e) said skins and juice being conducted from the vineyard to the winery within a substantially enclosed space.

3. The method as defined in claim 1 that includes the steps of:
   (e) cooling the skins and juice within said enclosed space by accelerating the vaporization of said juice over the rate of normal vaporization in the atmosphere outside said enclosed space.

4. The method as defined in claim 1 that includes the steps of:
   (e) maintaining a subatmospheric pressure within said enclosed space during said removal of said grapes into said enclosed space and during the fracturing of said skins.

5. The method of harvesting wine grapes that includes the steps of:
   (a) removing the grapes from the vines in the vineyard;
   (b) releasing the juice from the grapes after said grapes have been so removed from the vines by the step of impacting said grapes against a hard surface with sufficient force to fracture the skins and to substantially express said juice from said grapes;
   (c) then conducting said skins and grapes and the juice expressed therefrom from said vines to the vinery.

6. Apparatus for picking wine grapes and for converting it into must, comprising:
   (a) a vehicle adapted to be moved along a row of grape vines in a vineyard;
   (b) an enclosed receptacle on said vehicle;
   (c) a conduit having an inner end connected with said receptacle having a discharge opening at said inner end opening into said receptacle;
   (d) a nozzle having an inlet opening adapted to receive a bunch of grapes therein and of a diameter approximately that of the average maximum diameter of the bunches of grapes on said vines;
   (e) said nozzle having an outlet communicating with said inlet;
   (f) said conduit having an outer end outside said receptacle and said nozzle being connected with said outer end with said outlet on said nozzle communicating with the inside of said conduit at said outer end of the latter;
   (g) means connected with said receptacle for creating a partial vacuum therein and in said conduit and nozzle sufficient to detach the grapes on each bunch thereof that is adapted to be positioned within said inlet and to move the grapes so detached through said conduit for discharge into the latter with substantial force;
   (h) means within said receptacle against which grapes so discharged from said inner end of said conduit are adapted to be impacted under said force for fracturing the skins of said grapes to release the juice therein to thereby convert said grapes to must.

7. In apparatus as defined in claim 6:
   (i) the outer end portion of said conduit being flexible for movement of said nozzle vertically and laterally in opposite directions; and,
   (j) said inlet being directed generally upwardly for receiving said bunches of grapes depending from said vines upon upward movement of said nozzle.

8. In apparatus as defined in claim 6:
   (i) said means for creating a partial vacuum within said receptacle including a compartment positioned within the upper portion of said receptacle having an opening commmunicating with the interior of said receptacle, and a suction pump outside said receptacle communicating with the interior of said compartment;
   (j) said discharge outlet of said conduit opening into the upper portion of said receptacle spaced from said compartment and from said opening in the latter.

9. In apparatus as defined in claim 6:
   (i) said receptacle being vertically disposed and having a cylindrical sidewall;

(j) said discharge opening at the inner end of said conduit being adjacent to the inner side of said cylindrical sidewall in the upper portion of said receptacle and directed generally tangentially of said sidewall.

10. In apparatus as defined in claim 9:
(k) said means within said receptacle against which grapes discharged from said outlet are adapted to be discharged being a rigid element having a convexly rounded surface positioned to be impacted by said grapes.

11. In apparatus as defined in claim 6:
(i) means connected with said vehicle and movable therewith in a position adjacent to said nozzle for supporting an operator thereon during said movement.

12. In a construction as defined in claim 6:
(i) said conduit projecting laterally from said receptacle at a sufficient height to extend across the vines in a row to the side thereof that is opposite to the side adjacent to such vehicle when said vehicle is moving along said rows; and,
(j) a second conduit substantially corresponding to said first mentioned conduit connected with said receptacle and supported in a position at the same side of said row of vines as said vehicle;
(k) a nozzle on said second conduit corresponding to the nozzle on said first mentioned conduit.

13. Grape processing apparatus, comprising:
(a) an enclosed chamber;
(b) means for creating a partial vacuum in said chamber;
(c) an elongated conduit communicating with said chamber;
(d) a nozzle at the end of said conduit having an inlet opening communicating with said conduit;
(e) said inlet opening being so related to an average bunch of grapes on a vine as to be substantially wholly occluded by said bunch when the same is placed adjacent said opening for pulling said grapes along an enclosed path from the vine, through said conduit and into said chamber;
(f) means in said path engageable by said grapes moving therealong for fracturing said grapes.

14. The apparatus of claim 13, wherein:
(g) said vacuum creating means being capable of creating a partial vacuum at said unobstructed nozzle opening of the order of five inches of mercury.

15. The method of harvesting wine grapes that includes the steps of:
(a) removing the grapes in the vineyard at the vines from the main stem of each bunch of grapes leaving said main stems on the vines, and thereafter;
(b) moving the grapes so removed along a path of travel from the said vines in the vineyard to the winery for transfer at the winery to a fermenting tank;
(c) maintaining said grapes against contamination by dust, insects and the like in the atmospheric air from the moment said grapes are removed from the vines until they have reached the winery;
(d) fracturing the skins of said grapes substantially immediately after they have been removed from the vines to release the juice therefrom; and,
(e) said movement of said grapes in said path including the movement of said fractured skins and the juice released therefrom.

References Cited by the Examiner
UNITED STATES PATENTS

| | | | |
|---|---|---|---|
| 1,101,331 | 6/1914 | Reivoehl | 56—331 |
| 1,302,531 | 5/1919 | Dilley | 56—330 |
| 2,131,672 | 9/1938 | Rich | 56—328 |
| 2,499,037 | 2/1950 | Roles | 56—328 X |
| 2,785,522 | 3/1957 | McKenzie | 56—31 |
| 2,852,387 | 9/1958 | Perelli-Minetti | 99—35 |
| 2,893,194 | 7/1959 | Lamouria | 56—331 |
| 2,928,741 | 3/1960 | Arengo-Jones | 99—35 |
| 3,036,921 | 5/1962 | Rietz | 99—105 |

ABRAHAM G. STONE, *Primary Examiner.*

A. H. WINKELSTEIN, RUSSELL R. KINSEY, ANTONIO F. GUIDA, T. GRAHAM CRAVER,
*Examiners.*